(No Model.)

R. O. HOOD.
ELECTRIC METER.

No. 549,195.  Patented Nov. 5, 1895.

WITNESSES.  INVENTOR.
Matthew M. Blunt,  Ralph O. Hood
C. C. Stecher  by A. W. Rossley
M. B. May  his ATT'Y.

UNITED STATES PATENT OFFICE.

RALPH O. HOOD, OF DANVERS, MASSACHUSETTS.

ELECTRIC METER.

SPECIFICATION forming part of Letters Patent No. 549,195, dated November 5, 1895.

Application filed March 9, 1895. Serial No. 541,188. (No model.)

*To all whom it may concern:*

Be it known that I, RALPH O. HOOD, of Danvers, in the county of Essex and State of Massachusetts, have invented certain new and useful Improvements in Electric Meters, of which the following is a specification.

This invention relates to electric meters for use on either alternating or continuous currents, being based upon the principle that a force acting upon a constant mass will in equal durations of time give to it a velocity proportional to the strength of the force. Consequently if a force be produced which varies with the electricity in use on a circuit, and it is made to act upon a mass to give it a movement, then if the movement of the mass be intermittingly retarded for a predetermined period at regular intervals of time the velocity of the mass during its unretarded periods, (or the space traversed by the mass at such times,) if recorded, will indicate the amount of electricity consumed in the circuit.

My invention therefore consists in an electric meter comprising in its construction a coil in the circuit to be measured, a movable mass acted upon by the dynamic action of said coil, an intermittingly-acting device for retarding the movement of the mass, and a device for recording said movements. The details of the invention will be hereinafter set forth.

Reference is to be had to the annexed drawings and to the letters marked thereon, forming a part of this specification, the same letters designating the same parts or features, as the case may be, wherever they occur.

Figure 1:
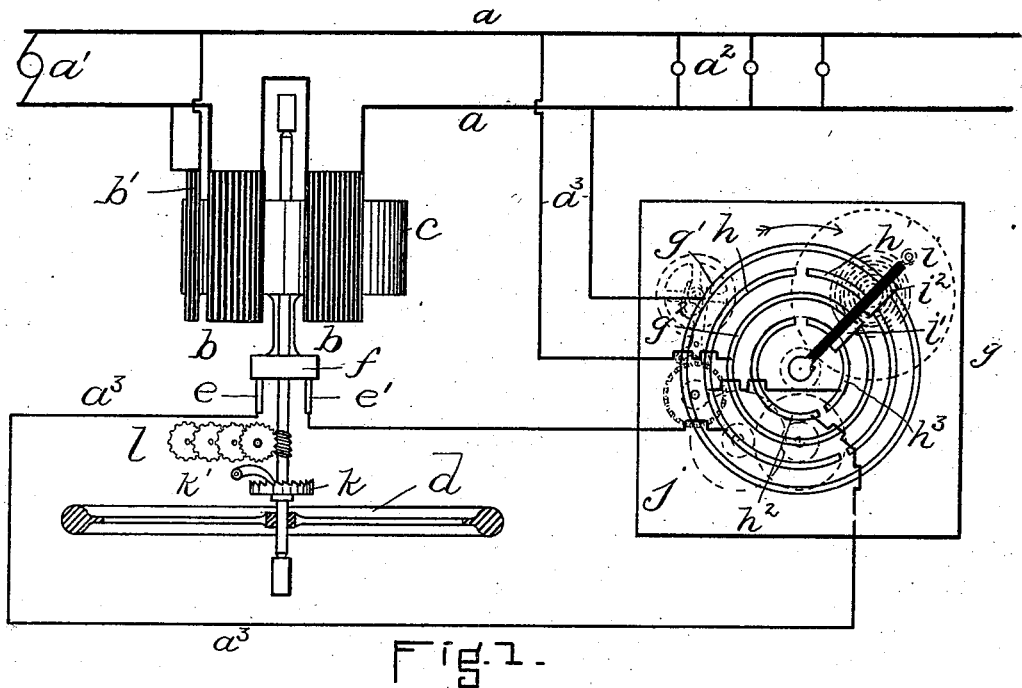
Figure 2:
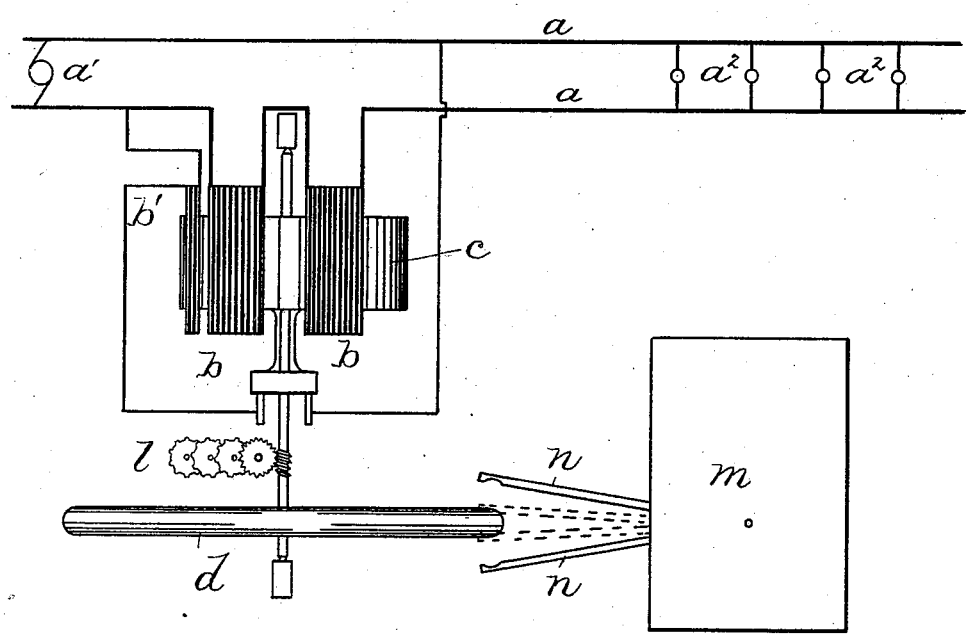

Of the drawings, Figure 1 is a diagrammatic view illustrating one form in which my invention may be embodied. Fig. 2 is a diagrammatic view illustrating another form in which my invention may be embodied.

Referring more particularly to Fig. 1, $a$ $a$ indicate the main circuit to be measured, it having a generating source $a'$ and consumption devices $a^2$ $a^2$. In this circuit I place an electric motor whose fixed field-cores $b$ $b$ are connected in series therewith, the movable coils or armature $c$ of the motor being in a shunt-circuit $a^3$ $a^3$. As there is no iron in the coils of the motor and the speed of the motor being very low, the force exerted between the fixed coils and the movable armature-coils, which latter have a very high resistance, varies with the energy consumed in the work circuit, according to well-known principles. The mass, which consists of the armature and its parts, requires an additional weight to add stability to its movements. Hence I employ a fly-wheel or ring-like weight $d$, and mount it rigidly upon the armature-shaft, which is suitably journaled in antifriction-bearings. In the shunt-circuit $a^3$ $a^3$, which includes brushes $e$ $e'$, commutator $f$, and armature $c$, I place a reversing-switch $g$ for intermittingly reversing the current through the armature-coils at regular and predetermined intervals of time. The switch consists of an insulated base-plate having concentric contact-rings $g'$ $g^2$, with which the two sides of the main circuit are in constant connection, respectively. There are two other contact-rings, one consisting of the insulated arc-like portions $h$ $h'$ and the other consisting of the arc-like portions $h^2$ $h^3$. Contacts $h$ and $h^3$ are connected, as are contacts $h'$ $h^2$, respectively.

$i$ is a pivoted insulated arm provided with two contact-plates $i'$ $i^2$. It will be seen that as the arm is rotated the contact-plates passing around the rings will cause the reversing of the current through the armature-coils, as contact-plates $i$ and $i^2$ during the first part of the revolution of the arms $i$ connect contacts $h^3$ and $g^2$ and $h'$ and $g'$ and during the latter part of the revolution will connect contacts $h^2$ and $g^2$ and $h$ and $g'$. In order that the arm shall continuously rotate at regular intervals of time, I employ a constant motor $j$, which may be operated by clockwork, or a constant-speed electric motor connected directly with the circuit $a$ $a$. If clockwork be employed, it may be wound automatically by any of the well-known electric clock-winding devices.

The armature-shaft is provided with a ratchet $k$ and a pawl $k'$ to keep it from rotating in the wrong direction when the current is reversed.

I have indicated at $l$ a recording device connected to the armature-shaft. Said device may be one of any of the recording mechanisms now in use and records the movements of said armature-shaft.

At $b'$ there is a starting-coil for compensating for the friction caused by the bearings of the motor.

The operation of the meter is as follows: Suppose the motor to be at rest and the arm $i$ just moving contact-plates $i'$ $i^2$, so as to engage contacts $h^3$ $g^2$ and $h'$ $g'$, which will give the armature a forward motion. The armature will begin to revolve and increase in speed in proportion to the amount of force exerted between its stationary coils and the movable coils, which force varies with the electricity in use, as heretofore stated. When the contacts $i'$ $i^2$ have traversed contacts $h^3$ and $h'$ and engage contacts $h^2$ and $h$, respectively, the current in the movable coils will immediately be reversed and the movement of the armature will be be retarded and stopped, the speed diminishing in the same ratio with which it increased. Then during the period of time when the contact-plates are traversing contacts $h^2$ and $h$ the motor is stopped, the ratchet and pawl preventing the armature from rotating in the reverse direction; but as soon as connection is again made with contacts $h^3$ and $h'$ the armature begins to revolve. I preferably make contacts $h^3$ and $h'$ shorter in length than contacts $h^2$ and $h$, so that the current is thrown into the armature for rotating it for a shorter time than that during which the rotation of the armature is retarded. The number of revolutions of the armature-shaft will vary with the amount of electricity used and will be recorded by the device at $l$.

Referring now to Fig. 2, it will be seen that I utilize a modified device for retarding the movements of the armature. In this meter, instead of reversing the current through the armature-coils, I employ a mechanical device operated by an intermittingly-acting mechanism, which positively engages the armature-shaft and prevents its rotating at and for regular intervals of time. I dispense with the pawl and ratchet, but retain the fly-wheel or weight $d$.

At $m$ I show conventionally a constant motor actuated by clockwork or an electric motor. The motor operates to close and open jaws $n$ $n$ at predetermined intervals of time, so that said jaws will positively grasp fly-wheel $d$ and prevent it (and the armature) from rotating until they release it. The force revolving the fly-wheel or weight is so slight and the speed of rotation is so slow that it will be abruptly stopped by the lightest touch of the jaws. In this device, as in the one before described, the number of revolutions of the armature-shaft during the period in which its movements are not retarded is proportionate to the amount of electricity in use, and the recording of said revolutions will indicate the amount of the consumption of the current.

Having thus explained the nature of the invention and described a way of constructing and using the same, though without attempting to set forth all of the forms in which it may be made or all of the modes of its use, it is declared that what is claimed is—

1. In an electric meter, the combination of a coil placed in the circuit to be measured, a movable structure under the dynamic influence of said coil whereby it is moved, an automatic device for retarding the movement of said structure at regular intervals of time, and means for recording the movement of said structure.

2. In an electric meter, the combination of an electric motor placed in the circuit to be measured, means for stopping the revolution of the motor at regular intervals of time, and a device for recording the revolutions of the motor.

3. In an electric meter, the combination of a motor having its fixed coils in series with the main circuit, and its movable armature coils in a shunt circuit, means for stopping the movement of the armature at regular intervals of time, and a mechanism for recording the movement of said armature.

4. In an electric meter, an electric motor having its fixed coils in the main circuit, additional fixed starting coils in a shunt circuit, and its movable armature coils in a shunt circuit, means for stopping the movement of the armature at regular intervals of time, and a mechanism for recording the movement of said armature.

5. In an electric meter, an electric motor having its fixed coils in the main circuit and its movable armature coils in a shunt circuit, a reversing switch for reversing the current in said armature, and a motor for operating said reversing switch at regular intervals of time.

In testimony whereof I have signed my name to this specification, in the presence of two subscribing witnesses, this 6th day of March, A. D. 1895.

RALPH O. HOOD.

Witnesses:
   ARTHUR W. CROSSLEY,
   MARCUS B. MAY.